United States Patent

Kobayashi et al.

[11] Patent Number: 5,990,954
[45] Date of Patent: Nov. 23, 1999

[54] ELECTRONIC IMAGING APPARATUS HAVING A FUNCTIONAL OPERATION CONTROLLED BY A VIEWPOINT DETECTOR

[75] Inventors: Takashi Kobayashi, Mitaka; Hirofumi Nakano, Yokohama, both of Japan

[73] Assignee: Canon Kabushiki Kaisha, Tokyo, Japan

[21] Appl. No.: 08/418,466

[22] Filed: Apr. 7, 1995

[30] Foreign Application Priority Data

Apr. 12, 1994 [JP] Japan .................................. 6-073640
Apr. 12, 1994 [JP] Japan .................................. 6-073647

[51] Int. Cl.$^6$ ................................................. H04N 5/225
[52] U.S. Cl. ............................................ 348/334; 348/333
[58] Field of Search ............................... 348/333, 334, 348/350; 345/145, 146, 156, 157

[56] References Cited

U.S. PATENT DOCUMENTS

| | | | |
|---|---|---|---|
| 4,109,145 | 8/1978 | Graf | 250/201 |
| 4,595,980 | 6/1986 | Garwin et al. | 364/518 |
| 4,836,670 | 6/1989 | Hutchinson | 351/210 |
| 4,946,271 | 8/1990 | Palsgard et al. | 351/210 |
| 5,245,371 | 9/1993 | Nagano et al. | 354/62 |
| 5,424,772 | 6/1995 | Aoki et al. | 348/334 |
| 5,541,655 | 7/1996 | Kaneda | 348/333 |
| 5,559,943 | 9/1996 | Cyr et al. | 345/145 |
| 5,579,048 | 11/1996 | Hirasawa | 348/334 |

FOREIGN PATENT DOCUMENTS

| | | | |
|---|---|---|---|
| 1241511 | 9/1989 | Japan . | |
| 2-32312 | 2/1990 | Japan . | |
| 3087818 | 12/1991 | Japan . | |
| 4---202 | 1/1992 | Japan . | |
| 4023027 | 1/1992 | Japan . | |
| 05183798 | 7/1993 | Japan | H04N 5/232 |
| 5-191682 | 7/1993 | Japan | H04N 5/225 |
| 5-191683 | 7/1993 | Japan | H04N 5/225 |
| 4-96580 | 4/1998 | Japan | H04N 5/225 |

*Primary Examiner*—Wendy Garber
*Attorney, Agent, or Firm*—Fitzpatrick, Cella, Harper & Scinto

[57] ABSTRACT

An electronic equipment having a viewpoint detection unit comprises an area display circuit for displaying a predetermined area on a screen, a viewpoint detector for detecting a viewpoint of an operator, a switching circuit for detecting whether the viewpoint of the operator detected by the viewpoint detector is within the area or not and switching the operation state of a predetermined function between a first state and a second state depending on the detection result, and a unit for changing a border line position of the area on the screen between when the operation state is shifted from the first state to the second state and when it is shifted from the second state to the first state.

38 Claims, 12 Drawing Sheets

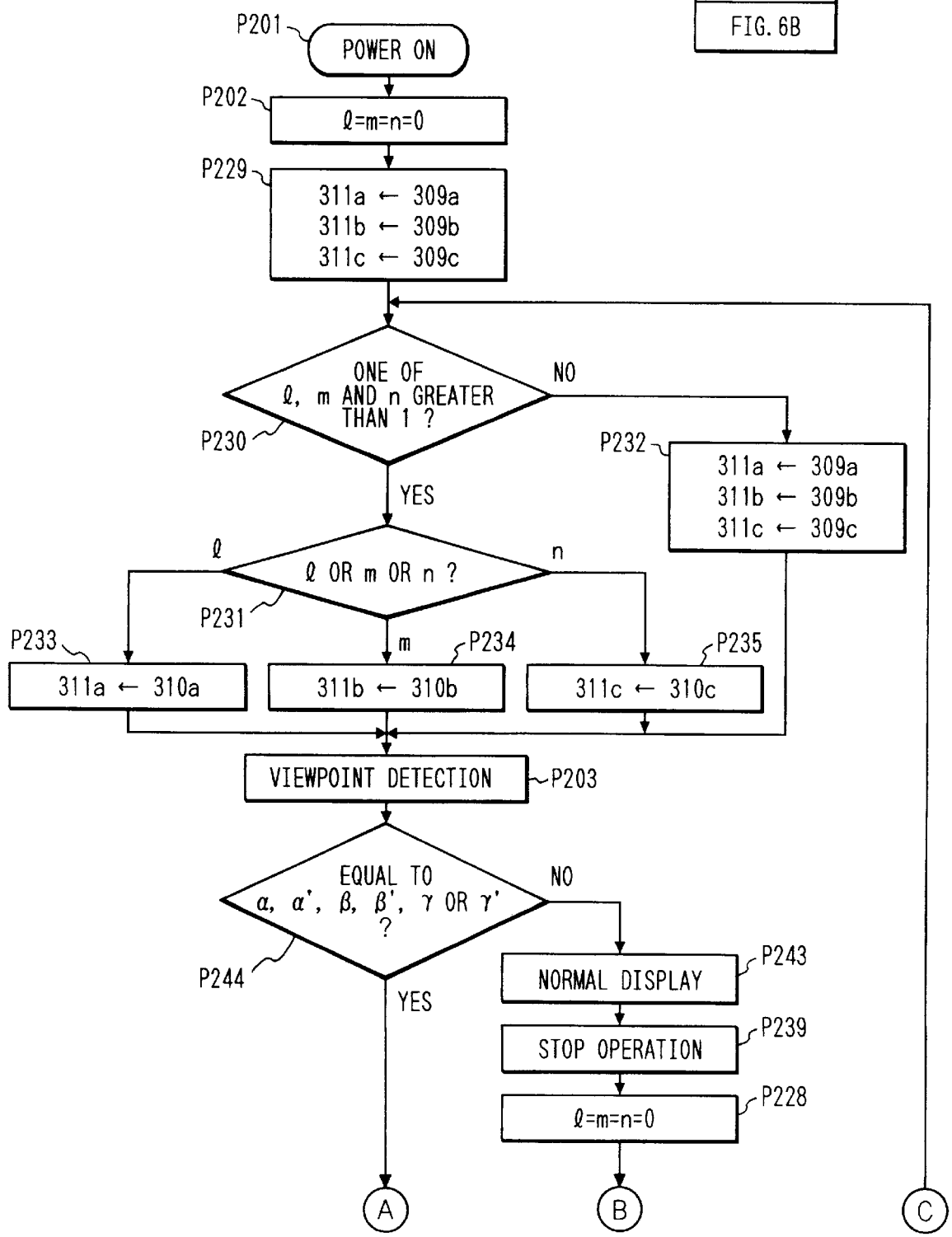
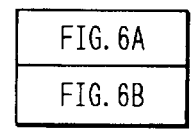

ELECTRONIC IMAGING APPARATUS HAVING A FUNCTIONAL OPERATION CONTROLLED BY A VIEWPOINT DETECTOR

BACKGROUND OF THE INVENTION

1. Field of the Invention

The present invention relates to electronic equipment for controlling a function by using a viewpoint detector.

2. Related Background Art

Recent advancement in the image processing field (including a video equipment such as a video camera) is remarkable and improvements of operability image in common have been made in common to various types of equipments. Operation and control using a viewpoint input is effected to perform a function corresponding to an index which is displayed on a display screen and viewed by an operator, without manual keying.

Such input means using the viewpoint is disclosed in U.S. Pat. No. 4,946,271 and U.S. Pat. No. 4,109,145, in which, when an operator views a mark or area displayed on a display, a function corresponding to the mark is performed.

However, in such arrangements, when the operator desires to activate a function of a viewpoint switch, the operator must continuously watch the index for a while without moving his/her viewpoint. Thus, when an area in which the index is located is small, the operator may feel fatigue.

If the area of the index is expanded to avoid the fatigue of the operator caused by keeping his/her view the narrow area, the function of the viewpoint switch may be activated against the operators's intent.

If an index which operates as a function of a viewpoint switch and an index which does not operate as a function of the viewpoint switch coexist in a finder field, the operator cannot discriminate between both indices by one glance. The operator may inadvertently watch the index of the viewpoint switch and an unintended function may be performed.

SUMMARY OF THE INVENTION

It is a first object of the present invention to reduce the fatigue of the operator when he/she activates the function of the viewpoint switch and also reduce malfunction of the viewpoint switch.

It is a second object of the present invention to permit the operator to readily discriminate an index of the viewpoint switch from other indexes.

In order to achieve the above objects, in accordance with the present invention, there is provided an electronic equipment having a viewpoint switch for activating a function represented by one of a plurality of indices representing different functions displayed on a monitor screen, when said one index is watched by an operator for a predetermined time period; area modification means for moving a border line of an area functioning as said viewpoint switch means on the finder screen to a different position as a state of switching the index by the operator changes.

In accordance with a preferred embodiment of the present invention, there is provided an electronic equipment comprising: a viewpoint switch for activating a function represented by an index displayed on a monitor screen when the index is watched by an operator for a predetermined time period; viewpoint detection means for detecting a viewpoint position of the operator on the finder screen; discrimination means for determining whether the viewpoint detected by said viewpoint detection means is present in an area functioning as the viewpoint switch for the predetermined time period or not; and area modification means for moving a border line of the area functioning as the viewpoint switch to a different position in accordance with the determination by said discrimination means.

In accordance with a preferred embodiment of the present invention, there is provided an electronic equipment including display state control means for displaying the indices functioning as the viewpoint switch and the indices not functioning as the viewpoint switch, of a plurality of indices displayed on the monitor screen in different colors from each other.

In accordance with a preferred embodiment of the present invention, there is provided an electronic equipment including a viewpoint control unit comprising: viewpoint detection means for detecting a viewpoint on a screen; viewpoint switch means for activating a function when said viewpoint detection means detects the watching of a predetermined area on the screen for a predetermined time period; and control means for changing a border line of the predetermined area between the activation state and the deactivation state of said viewpoint switch means.

In accordance with a preferred embodiment of the present invention, there is provided a viewpoint control unit, wherein said detection means turns on said viewpoint switch means when the viewpoint is sampled at a predetermined period and the predetermined area is watched continuously a predetermined number of times.

In accordance with a preferred embodiment of the present invention, there is provided a viewpoint control unit, wherein said viewpoint switch means changes the display of the predetermined area between the on state and the off state.

It is a third object of the present invention to improve operability of a video camera.

In order to achieve the above object, in accordance with a preferred embodiment of the present invention, the function of the viewpoint switch is a zooming function.

In accordance with a preferred embodiment of the present invention, the function of the viewpoint switch is a fading function.

It is a fourth object of the present invention to provide an error-free on/off operation of the viewpoint switch.

In order to achieve the above object, in accordance with a preferred embodiment of the present invention, there is provided a viewpoint control unit comprising: viewpoint detection means for detecting a viewpoint on a screen; viewpoint switch means for performing a predetermined function, when said viewpoint detection means detects the watching of a predetermined area on the screen for a first time period and stopping the execution of the function when said viewpoint detection means detects the watching of the predetermined area for a second time period different from the first time period.

In accordance with a preferred embodiment of the present invention, the viewpoint detection means turns on said viewpoint switch means when the viewpoint is sampled at a predetermined period and the predetermined area is watched continuously a predetermined number of times.

In accordance with a preferred embodiment of the present invention, the first time period is set longer than the second time period.

Other objects and features of the present invention will be apparent from the following description of the specification and the accompanying drawings.

DETAILED DESCRIPTION OF THE PREFERRED EMBODIMENTS

Referring to the accompanying drawings, embodiments of the electronic equipment having the viewpoint detector in accordance with the present invention are explained.

First, a principle of the viewpoint detector is explained.

A so-called viewpoint input function is supplied in which an indices representing various types of functions, such as zooming and fading, are displayed on a finder screen of a video camera, and one of the indices is selected by a viewpoint. A principle of the viewpoint input function is explained below.

Figure 1A:
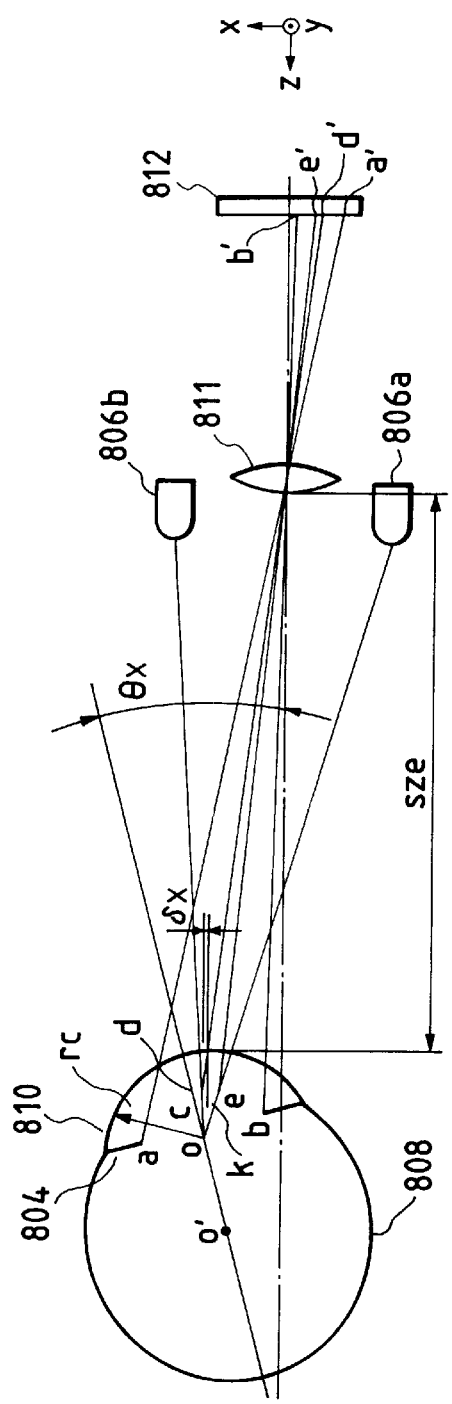
FIGS. 1A and 1B illustrate a principle of viewpoint detection.
Figure 1B:
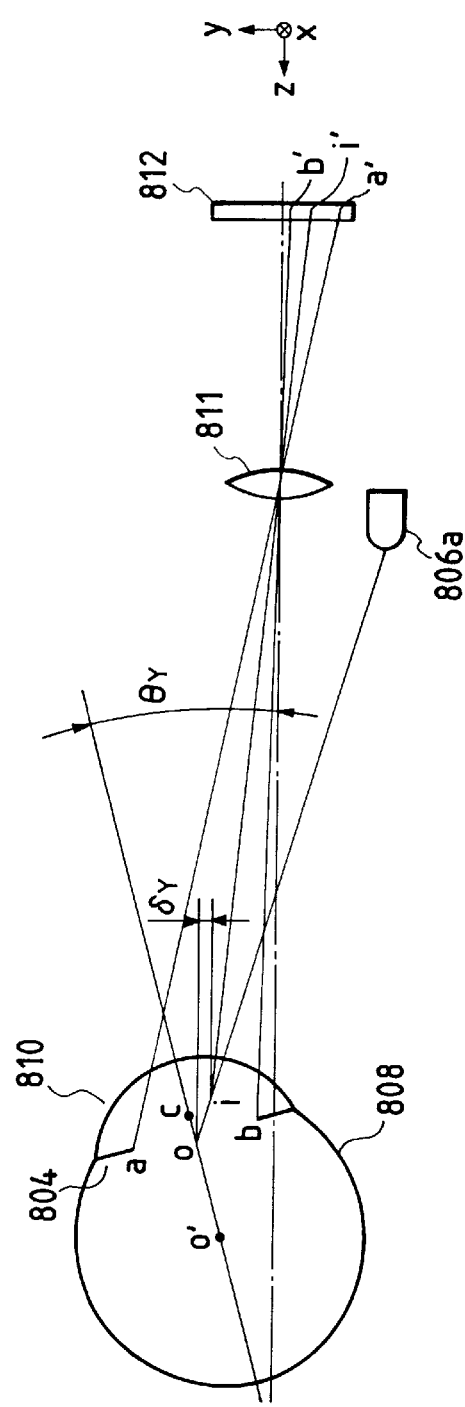

FIG. 1A illustrates a principle of a viewpoint detection method and shows a top view of a viewpoint detection means for realizing a viewpoint function and an eyeball. FIG. 1B also illustrates a principle of the viewpoint detection method and shows a side elevational view of the viewpoint detection means and the eyeball.

In FIGS. 1A and 1B, numerals 806a and 806b denote light sources such as light emitting diodes (IRED), which emit infrared rays not visible by a viewer. As shown in FIG. 1A, the light sources 806a and 806b are arranged substantially symmetrically in an x-axis direction (horizontal direction) with respect to an optical axis of a focusing lens 811. As shown in FIG. 1B, the light sources 806a and 806b are arranged slightly below the optical axis in a y-axis direction (vertical direction).

The light sources 806a and 806b scatterly illuminate the eyeball of the viewer under such an arrangement. Portions of the illumination lights emitted from the light sources 806a and 806b and reflected by the eyeball are focused by the focusing lens 811 and focused on an image sensor (photoelectric converter) 812.

Figure 2A:
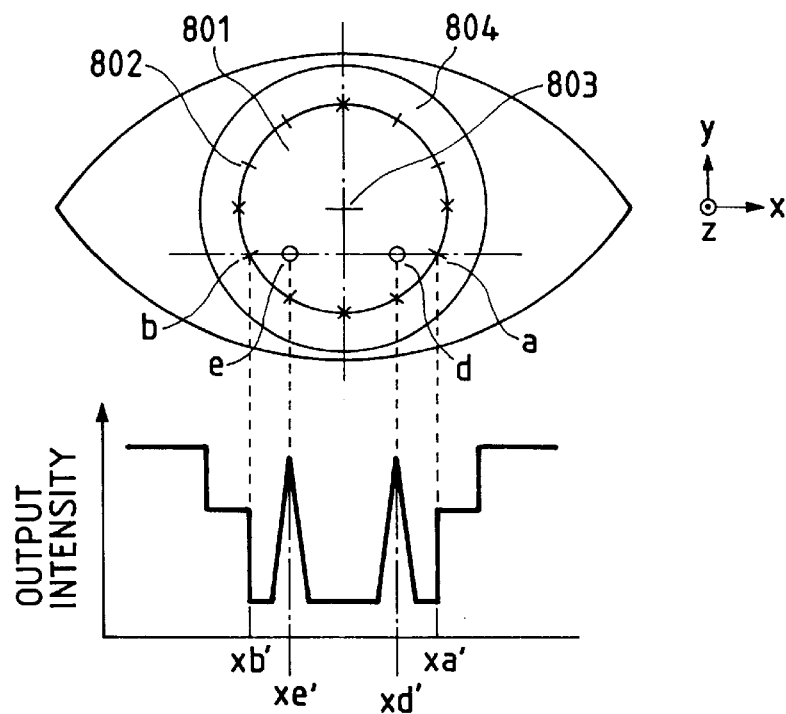
FIGS. 2A and 2B illustrate a principle of viewpoint detection.
Figure 2B:
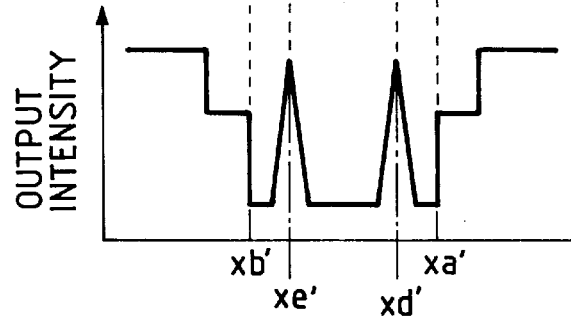

FIG. 2A schematically shows an image of the eyeball 808 projected to the image sensor 812, and FIG. 2B shows a distribution of output intensity of the image sensor 812.

Referring to FIGS. 1A and 1B and FIGS. 2A and 2B, a detection method for the viewpoint is explained.

A horizontal plane shown in FIGS. 1A and 1B is first considered. An infrared ray, emitted from the light source 806b, illuminates a horny coat 810 of the eyeball 808. A horny coat reflected image (virtual image) d formed by the infrared ray, reflected by the surface of the horny coat 810, is focused by the focusing lens 811 and focused at a position d' on the image sensor 812.

Similarly, the infrared ray emitted from the light source 806a illuminates the horny coat 810 of the eyeball 808. A horny coat reflected image (virtual image) e formed by the infrared ray, reflected by the surface of the horny coat 810, is focused by the focusing lens 811 and focused at a position e' on the image sensor 812.

Light beams from ends a and b of an iris 804 are projected to positions a' and b' on the image sensor 812 through the focusing lens 811, and the images of the ends a and b of the iris are focused at those position. For the convenience of description, x coordinates of the ends a and b of the iris 804 are represented by xa and xb, and x coordinates of the horny coat reflected images d and e are represented by xd and xe.

When the images of the ends a and b of the iris 804 and the horny coat reflected images d and e are focused on the image sensor 812, the image sensor 812 produces an output, as shown in FIG. 2B. In FIG. 2B, xa' and xb' represent the x coordinates of the positions a' and b', at which the images of the ends a and b of the iris 804 shown in FIG. 2A are focused on the image sensor 812, and xd' and xe' represent the x coordinates of the focusing positions d' and e' of the horny coat reflected images d and e on the image sensor 812.

When a rotation angle Ox of the eyeball 808 to the optical axis of the focusing lens 811 is small, the x coordinates, xa and xb of the ends a and b of the iris 804, may be determined at many points on the image sensor as shown by X in FIG. 2A. By using a number of x coordinates xa and xb, xc, which is an x coordinate of a center c of pupil, is calculated by a least square method.

On the other hand, assuming xo is an x coordinate of a center o, if curvature of the horny coat 810, from the horizontal rotation angle θx relative to the optical axis of the eyeball 808, $$oc^* \sin \theta x = xc - xo \quad (1)$$

is derived, where oc represents a distance between the center o of curvature and the center c of pupil.

The coordinate xo is determined by taking into consideration a predetermined x axis correction value δx relative to an x coordinate xk of a center point k between the horny coat reflected image d and the horny coat reflected image e;

$$xk = (xd + xe)/2$$

$$xo = (xd + xe)/2 + \delta x \quad (2)$$

where the correction value δx may be determined geometrically from the arrangement of the apparatus and the distance between the apparatus and the eyeball, but the description of the calculation method is omitted.

The formula (1) is substituted for the formula (2) to determine the rotation angle θx relative to the optical axis of the eyeball 808;

$$\theta x = \sin^{-1}\left[[xc-\{(xd+xe)/2+\delta x\}]/oc\right] \quad (3)$$

In order to determine coordinates of characteristic points projected on the image sensor 812, dashes (') are added to the x coordinates of the characteristic points in the formula (3) to create a formula (4);

$$\theta x = \sin^{-1}\left[[xc'-\{(xd'+xe')/2+\delta x'\}]/oc/\beta\right] \quad (4)$$

where $\beta$ represents a magnification factor determined by a distance sze between the focusing lens 811 and the eyeball 808 and it may actually be determined as a function of a distance $|xd'-xe'|$ between the horny coat reflected images da and e.

A vertical plane shown in FIG. 1B is now considered. The horny coat reflected images formed by the two light sources 806a and 806b are formed at the same position. The horny coat reflected images are designated by i and a y coordinate thereof is represented by yi. A method for calculating the rotation angle $\theta y$ relative to the optical axis of the eyeball 808 is substantially identical to that for the horizontal plane, but the formula (2) is slightly different.

Assuming that the y coordinate of the center o of curvature of the horny coat 810 is represented by yo, $$yo = yi + \delta y \quad (5)$$

where the y axis correction value $\delta y$ may be determined geometrically from the arrangement of the apparatus and the distance to the eyeball, and the description of the calculation method is omitted.

The vertical rotation angle $\delta y$ relative to the optical axis of the eyeball 808 is determined by using the formula (1) having converted for the y coordinate and the formula (5);

$$\theta y = \sin^{-1}\left[\{yc'-(yi'+\delta y')\}/oc/\beta\right] \quad (6)$$

Position coordinates (xn, yn) on the horizontal plane on the finder screen of the video camera are given by:

$$xn = m^*\sin^{-1}\left[\{xc'-(xd'+xe')/2-\delta x'\}/oc/\beta\right] \quad (7)$$

on the vertical plane:

$$yn = m^*\sin^{-1}\left[\{yc'-(xi'+\delta y')\}/oc/\beta\right] \quad (8)$$

As shown in FIGS. 2A and 2B, the edge of the pupil is detected by utilizing a rise of an output waveform at the position xb' of the image sensor 812 and a fall at the position xa'. The coordinates of the horny coat reflected images d and e are determined by utilizing sharp rises (xe' and xd'). In this manner, the viewpoint is detected.

In order to clarify the features of the present invention, a viewpoint switch designed prior to the present invention for selecting functions, such as zooming and fading of the video camera, is explained.

Figure 7:
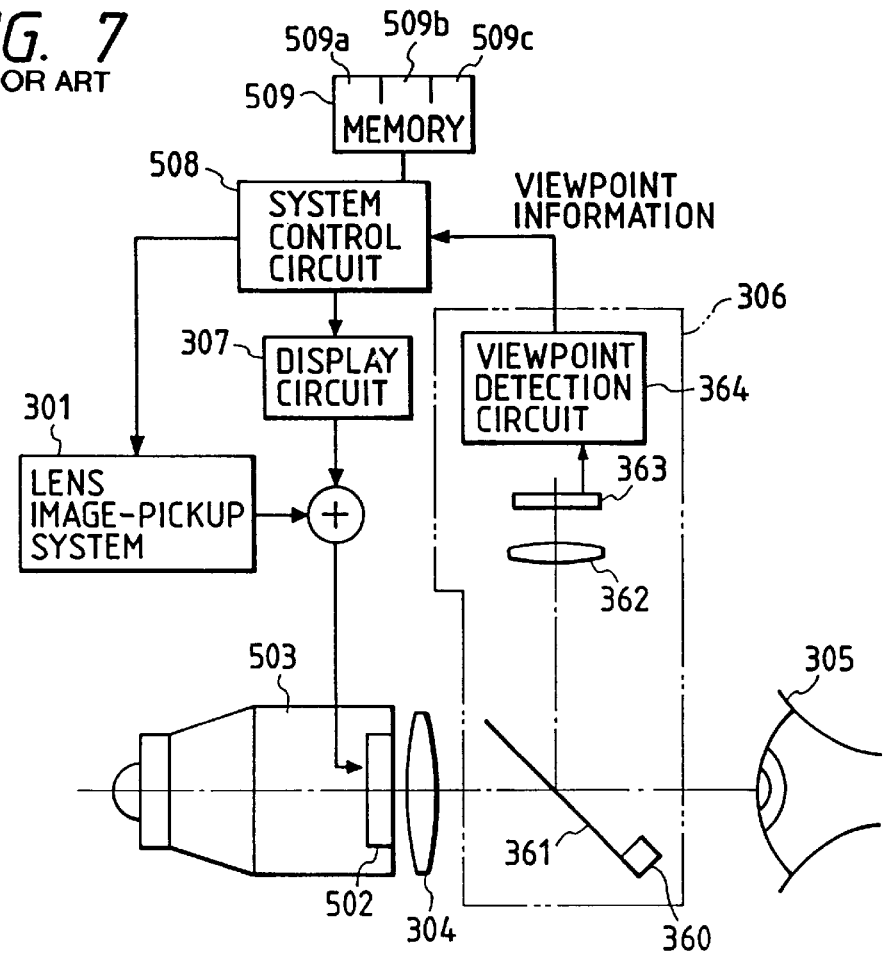
FIG. 7 shows a general configuration of a video camera.

FIG. 7 shows a schematic configuration of a video camera having a view switch function.

The video camera shown in FIG. 7 comprises a lens system 301 having a zoom lens for taking an object, a finder 503 for viewing the object taken by the lens system 301 through a finder screen 502, an eye lens 304 arranged in front of the finder 503, viewpoint detection means 306 for detecting a viewpoint 305 of an operator, a display circuit 307 for displaying information required by the operator to a finder screen 502, system control means 508 for controlling respective units of the video camera, and a memory 509 for storing coordinates of indices of the viewpoint switch on the finder screen 502.

The information displayed on the finder screen 502 may include an AF frame representing a general focus area, indices of the viewpoint switch and other information necessary to the operator, such as a tape count and a photographing mode.

The viewpoint detection means 306 comprises an infrared ray emitting diode 360, a dichroic mirror 361 which passes a visible ray and reflects an infrared ray, a focusing lens 362 for focusing the infrared ray reflected by the dichroic mirror 361, a photo-electric converter 363 for converting the infrared ray focused by the focusing lens 362 to an electrical signal, and a viewpoint detection circuit 364 for determining a viewpoint of the operator on the finder screen 502.

Since the dichroic mirror 361 passes the visible ray, the operator can observe the finder screen 502 through the eye lens 304. Since the dichroic mirror 361 reflects the infrared ray, it reflects a reflected image of the eye 305 by the infrared ray irradiated from the infrared ray emitting diode 360. The reflected light by the dichroic mirror 361 is focused by the focusing lens 362 and focused on the photo-electric converter 363.

The viewpoint detection circuit 364 determines the viewpoint of the operator on the finder screen 502, based on the image of the eye of the operator on the photo-electric converter 363, in accordance with the principle described above and an algorithm disclosed in Japanese Laid-Open Patent Application Nos. 1-241511 and 2-32312.

Figure 8:
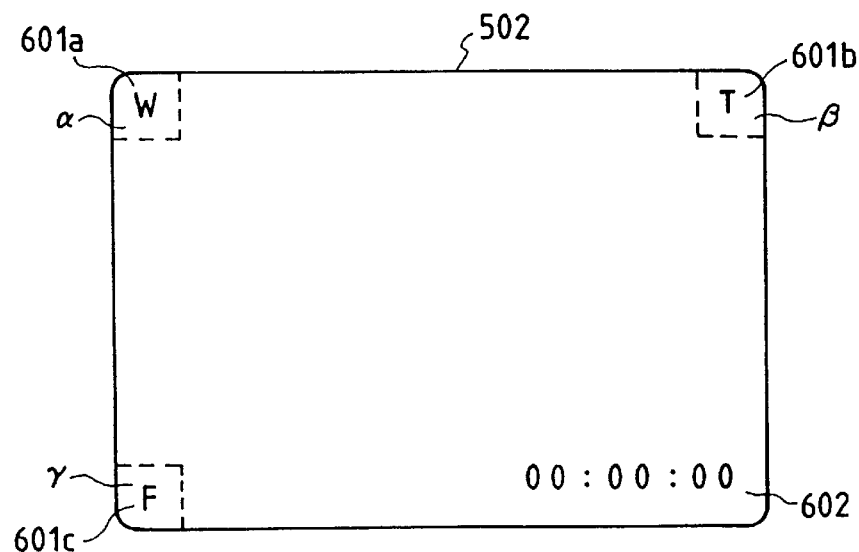
FIG. 8 shows an example of display of a finder screen of the video camera.

FIG. 8 shows an example of display of the finder screen 502. As seen from FIG. 8, a menu comprised of indices representing different operational functions indicated by alphabetic characters W, T and F is displayed on the finder screen 502.

The index W represents a zooming function toward wide angle, the index T represents a zooming function toward telescopic, and the index F represents a fading function. When the operator views one of those indices, the viewpoint is detected by the viewpoint detection means, and the corresponding function is performed by the system control means 508. Numeral 602 at a bottom right is not an index of the viewpoint switch.

A group of coordinates in a predetermined range, including the indices W, T and D of the viewpoint switch, are stored in memory areas 509a, 509b and 509c of a memory 509, respectively. The group of coordinates includes all of coordinates of ranges 601a, 601b and 601c encircled by broken lines including the indices W, T and F. The group of coordinates of the range including the index W of the wide angle function is represented by $\alpha$, the group of coordinates of the range including the index T of the telescopic function is represented by $\beta$, and the group of coordinates of the range including the index F of the fading function is represented by $\gamma$.

Figure 9:
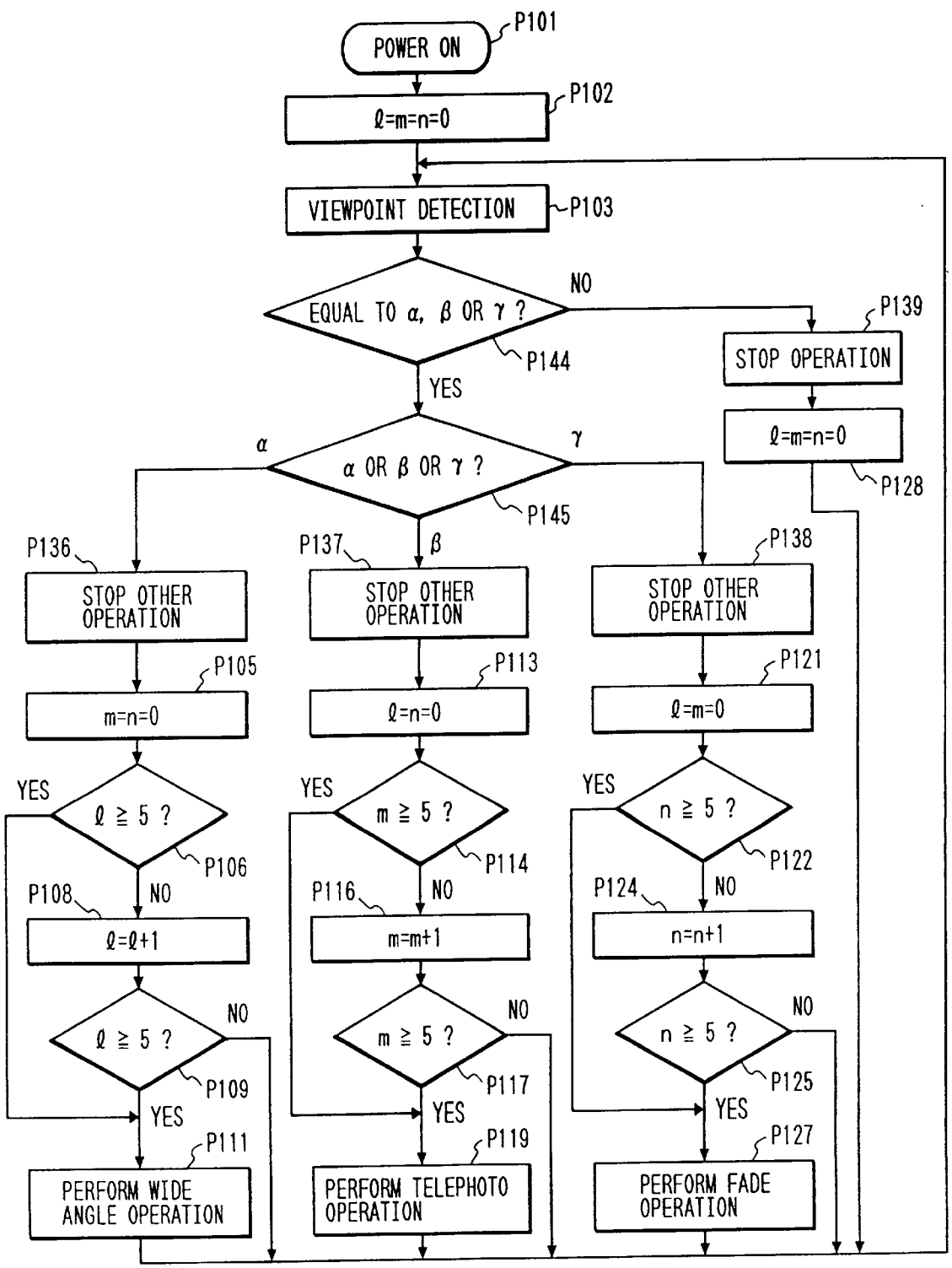
FIG. 9 shows a flow chart of an operation of system control means of the video camera.

Referring to a flow chart shown in FIG. 9, an operation of the system control means 508 is explained.

In a step P101, the video camera is powered on, and variables l, m and n are reset to 0 in a step P102 so that the function of the view switch is ready.

The variables l, m and n represent counts of the number of times of coincidence of the coordinate of the viewpoint of the operator with any one of the group of coordinates $\alpha$, any one of the group of coordinates $\beta$, and any one of the group of coordinates $\gamma$, respectively.

The system control means 508 continuously receives the coordinate information of the operator's viewpoint on the finder screen 502, while the operator watches the finder screen 502 and the viewpoint is normally detected. It is now assumed that the operator views the index W of the wide angle function.

In a step P103, the viewpoint of the operator is detected. When it is determined that the coordinate of the detected viewpoint essentially coincides with one of the group of coordinates a by a process in steps P144 and P145, the system controller 508 stops the operation of functions other than the wide angle function in a step P136 and resets the variables m and n to 0 in a step P105.

In a step P106, whether a count represented by the variable l is larger than a predetermined number of times (for example, 5 times) or not is determined, and if it is less than 5 times, the variable is incremented by one in a step P108. Whether the count of the variable l is larger than 5 times or not is again determined, and if it is less than 5 times, the process returns to P103 and the system control means 508 again receives the coordinate information of the viewpoint from the viewpoint detection means 306.

If the content of the variable l is no smaller than 5 times in the decision of the step P105 or P109, the zoom lens of the lens system 301 is driven toward the wide angle in a step P111 to perform the zooming function. Then, the process returns to the step P103 to receive the coordinate information of the viewpoint from the viewpoint detection means 306.

On the other hand, when the operator watches the index T of the telescopic function or the index F of the fading function, the operation is essentially identical to that described above. For example, when it is determined in the steps P144 and P145 that the coordinate of the viewpoint of the operator detected in the step P103 essentially coincides with one of the group of coordinates β, the system control means 508 stops the operation of functions other than the telescopic function in the step P137 and resets the variable l and n to 0 in the step P113. If it is determined that the content of the variable m is no smaller than 5 in the step P114 to P117, the telescopic function is performed in a step P119.

When it is determined that the coordinate of the viewpoint of the operator detected in the step P103 essentially corresponds to one of the group of coordinates γ in the steps P144 and P145, the system control means 508 stops the operation of functions other than the fading function in a step P121 and resets the variables l and m to 0 in steps P121. When it is determined that the content of the variable n is no smaller than 5 in the steps P122 to P125, the fading function is performed in a step P127.

If it is determined that the coordinate of the viewpoint of the operator detected in the step P103 does not coincide with any one of the groups of coordinates α, β and γ in the step P144, the system control means 508 stops the operations of the wide angle function, the telescopic function and the fading function in the step P139 and resets the variables l, m and n to 0 in the step P128.

In this manner, even if the coordinate of the viewpoint of the operator coincides with one of the group of coordinates α, the variable l is reset to 0 in any of the steps P113, P121 and P128 if the viewpoint moves off the range of the group α of coordinates even once before the number of times of coincidence reaches 5.

In the above arrangement, if the operator desires to activate the function of the viewpoint switch, the operator must continuously watch the index for a while without moving the viewpoint off the index. Thus, if the range in which the index lies is small, the operator feels fatigue.

If the range of the index is expanded to reduce the fatigue of the operator caused by continuously watching the narrow range, the function of the viewpoint switch may be activated against the intent of the operator.

Further when an index which operates as the function of the viewpoint switch and an index which does not operate as the function of the viewpoint switch coexist in the finder screen, the operator frequently cannot discriminate between the indices by one glance. Thus, the operator may inadvertently watch the index of the viewpoint switch, and the function not intended by the operator may be performed.

The present invention solves the above problems by the following configuration.

Figure 3:
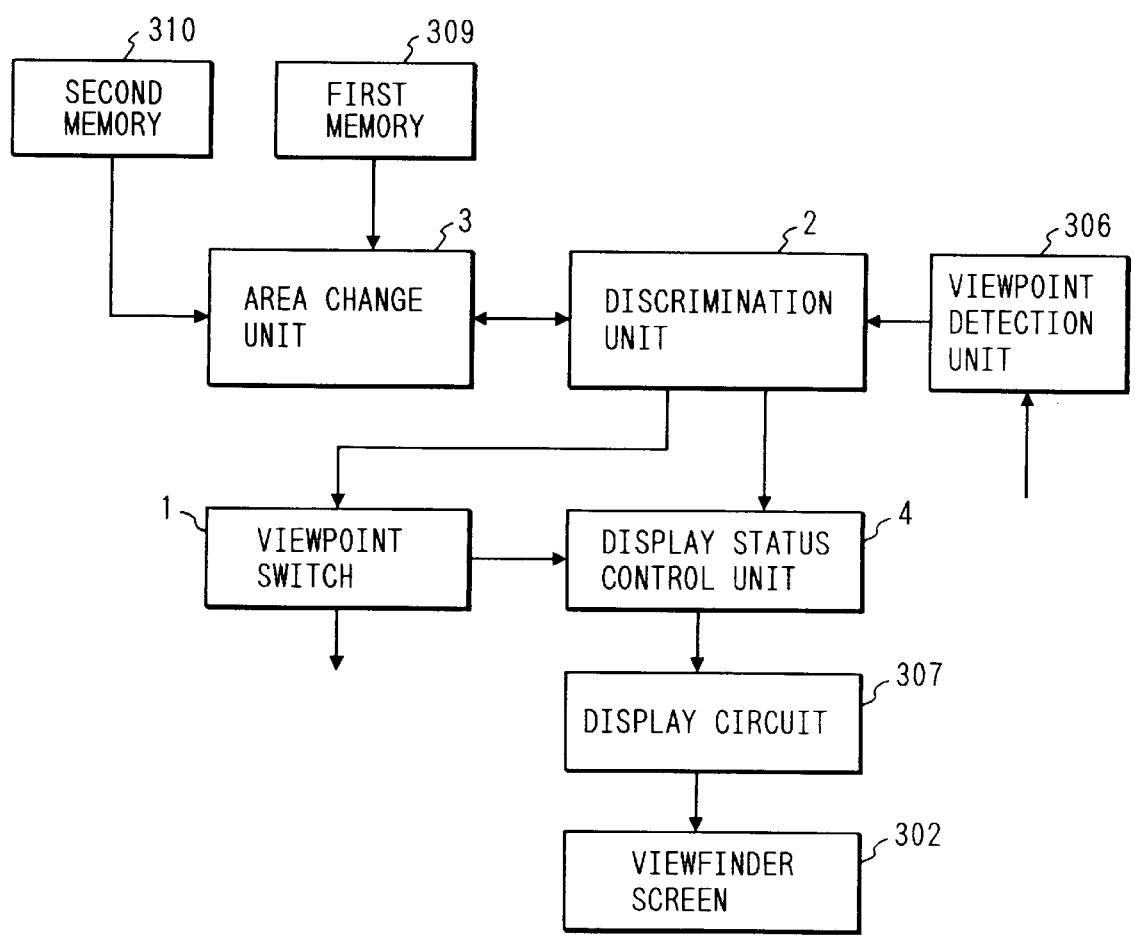
FIG. 3 shows a block diagram of an elemental feature of the present invention.

FIG. 3 shows an elemental feature of the video camera having the viewpoint switch in accordance with first embodiment of the present invention. In FIG. 3, numeral 1 denotes a viewpoint switch. When the operator watches one of a plurality of indices displayed on a finder screen 302 for a predetermined time, a function represented by that index is performed.

Numeral 4 denotes display status control means. It controls the display of indices which function as the viewpoint switch 1 and indices which do not function as the viewpoint switch 1, of a plurality of indices displayed on the finder screen 302 in different colors from each other. Namely, control information for performing the above control is sent from the display status control means 4 to a display circuit 307 and the indices are displayed on the finder screen 302.

Since the indices which function as the viewpoint switch 1 and other indices of the plurality of indices displayed on the finder screen 302 are displayed by different colors from each other, the indices which function as the viewpoint switch 1 and other indices can be readily discriminated.

Numeral 306 denotes viewpoint detection means, which detects the position of the viewpoint of the operator on the finder screen 302. Numeral 309 denotes a first memory, which stores a first relatively narrow area of a group of coordinates, which are in a range functioning as the viewpoint switch 1 and which are set when the operator does not watch the index. Numeral 310 denotes a second memory, which stores a second area of group of coordinates, larger than the first area, which are set when the operator watches the index for the predetermined time.

Numeral 2 denotes discrimination means, which determines whether the viewpoint of the operator detected by the viewpoint detection means 306 is present in the area functioning as the viewpoint switch 1 for the predetermined time or not. Numeral 3 denotes area modification means which moves the area functioning as the viewpoint switch 1 between the first area and the second area in accordance with the decision by the discrimination means 2.

For example, when the viewpoint of the operator on the finder screen 302 enters the first area while the operator does not yet watch the index, the area modification means 3 expands the area functioning as the viewpoint switch from the first area to the second area by using the coordinate information stored in the second memory 310.

When the viewpoint of the operator on the finder screen moves off the second area while the operator is watching the index, the area modification means 3 returns the area functioning as the viewpoint switch from the second area to the first area by using the coordinate information stored in the first memory 309.

When the operator intends to activate the viewpoint switch 1 by watching one of the indices, the index may be watched exactly the first time, and thereafter the area of the indices functioning as the viewpoint switch 1 may be widely set. Thus, if the viewpoint of the operator is within the wide area, the function of the viewpoint switch 1 does not function, even if the viewpoint of the operator deviates to some extent.

The display control means 4 may change the display status of the index in accordance with the decision by the discrimination means 2. For example, the index may be blinked after the operator has watched the index and before the function is performed. When the function is actually being performed, the index may be inverted in intensity so that the operator may identify the operation status of the viewpoint switch 1 by one glance.

A first embodiment of the video camera having the viewpoint switch is explained in the following description. A principle of the viewpoint detection is identical to that explained in FIGS. 1A and 1B and FIGS. 2A and 2B, and the explanation thereof is omitted.

Figure 5:
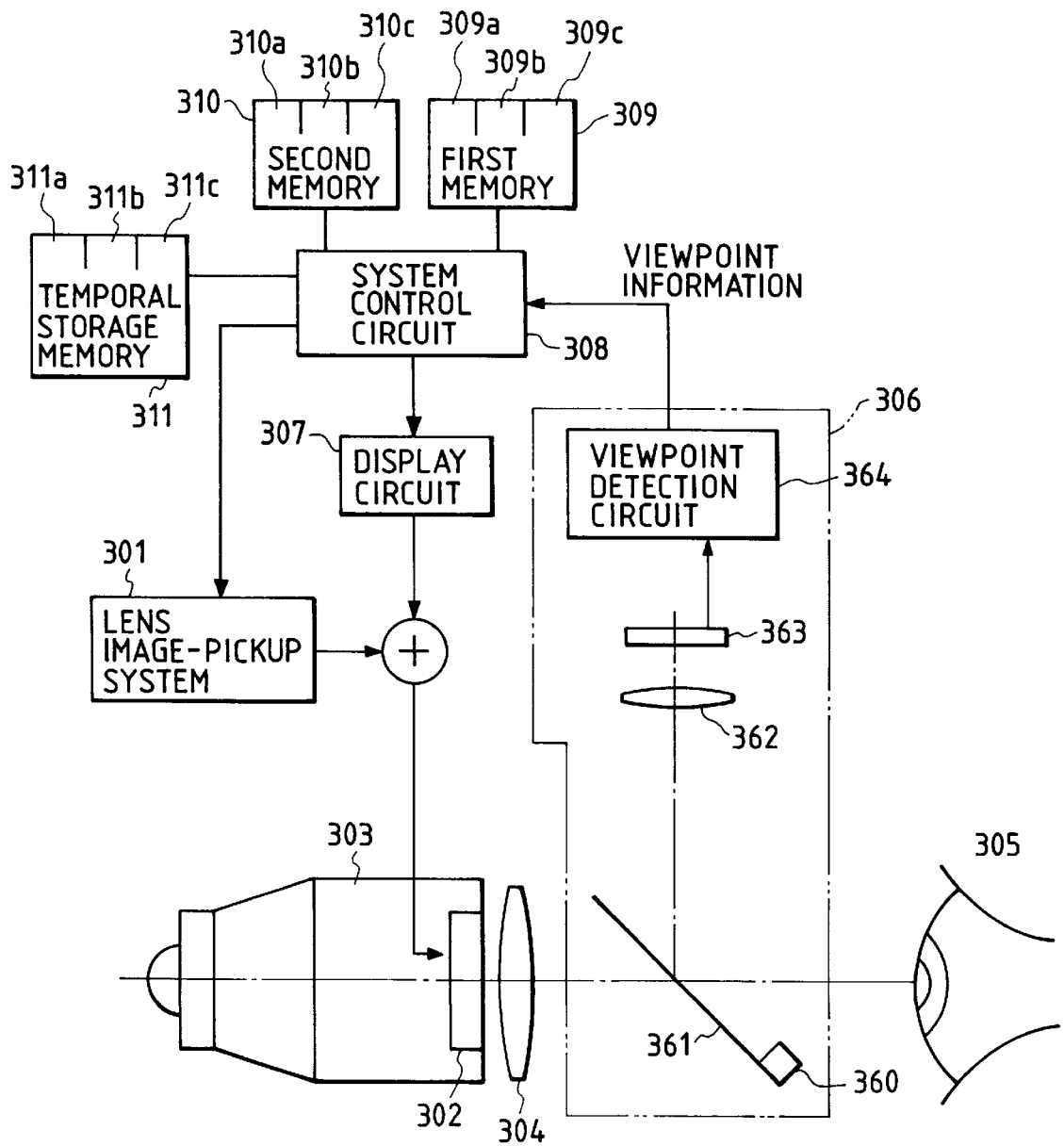
FIG. 5 shows a general configuration of the video camera in the embodiment.

FIG. 5 shows a block diagram of a configuration of the video camera having the viewpoint switch function in accordance with the present embodiment. In FIG. 5, the elements having the same numbers as those of the prior art, shown in FIG. 7, have the same functions, and only different elements are explained.

In the video camera of the present embodiment shown in FIG. 5, a first memory 309 and a second memory 310, which store predetermined groups of coordinates on the finder screen 302, are connected to system control means 308. A temporary memory 311 for temporarily storing the group of coordinates of the viewpoint switch is connected to system control means 308.

Figure 4:
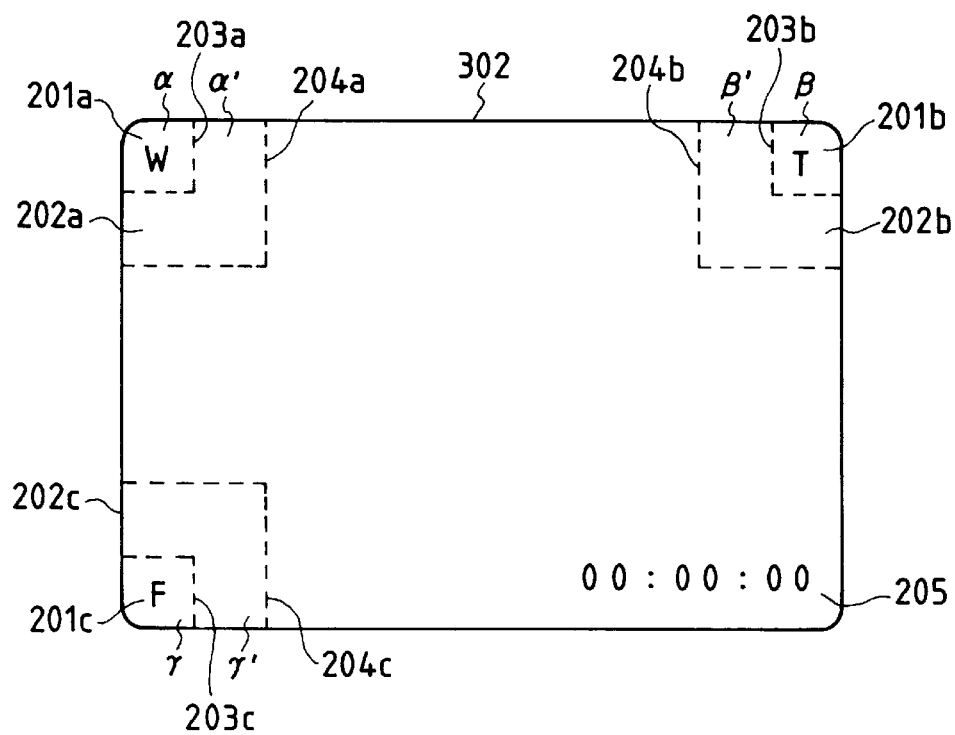
FIG. 4 shows an example of display of a finder screen of a video camera in one embodiment of the present invention.

FIG. 4 shows an example of display of the finder screen 302 in the present embodiment.

In FIG. 4, a menu comprising indices representing different operational functions from each other, shown by alphabetic characters W, T and F as they are in FIG. 7, is displayed on the finder screen 302.

For example, the index W represents the zooming function toward the wide angle; the index T represents the zooming function toward the telescopic, and the index F represents the fading function. When the operator watches one of those indices, the viewpoint is detected by the viewpoint detection means 306, and the corresponding function is performed by the system control circuit 308. A right bottom numeral 205 is not the index of the viewpoint switch; it represents a date.

Broken lines 203a, 203b and 203c and broken lines 204a, 204b and 204c represent border lines of coordinates on the finder screen 302 in a process of the system control circuit 308, and they are not actually displayed on the finder screen 302.

A group of coordinates in an area 201a encircled by a broken line 203a, including the index W of the wide angle function on the finder screen 302, are stored in a first memory area 309a in a first memory 309. A group of coordinates in an area 201b encircled by a broken line 203b, including the index T of the telescopic function is stored in a second memory area 309b.

A group of coordinates in an area 201c encircled by a broken line 203c, including the index F of the fading function is stored in a third memory area 309c.

The groups of coordinates in those area 201a, 201b and 201c correspond to the groups of coordinates α, β and γ, respectively.

On the other hand, a group of coordinate α' in an area 202 encircled by a broken line 204a, including the index W of the wide angle function on the finder screen 302 is stored in a first memory area 310a in a second memory 310. Namely, the group of coordinates α' in the area 202a include the group of coordinates α in the area 201a encircled by a broken line 203a.

A group of coordinates β' in an area 202b encircled by a broken line 204b, including the index T of the telescopic function is stored in a second area 310b. Namely, the group of coordinates β' in the area 202b include the group of coordinates β in the area 201b encircled by a broken line 203b.

A group of coordinates γ' in an area 202c encircled by a broken line 204c, containing the index F of the fading function is stored in a third memory area 310c. Namely, the group of coordinates γ' in the area 202c includes the group of coordinates γ in the area 201c encircled by a broken line 203c.

Figure 6B:
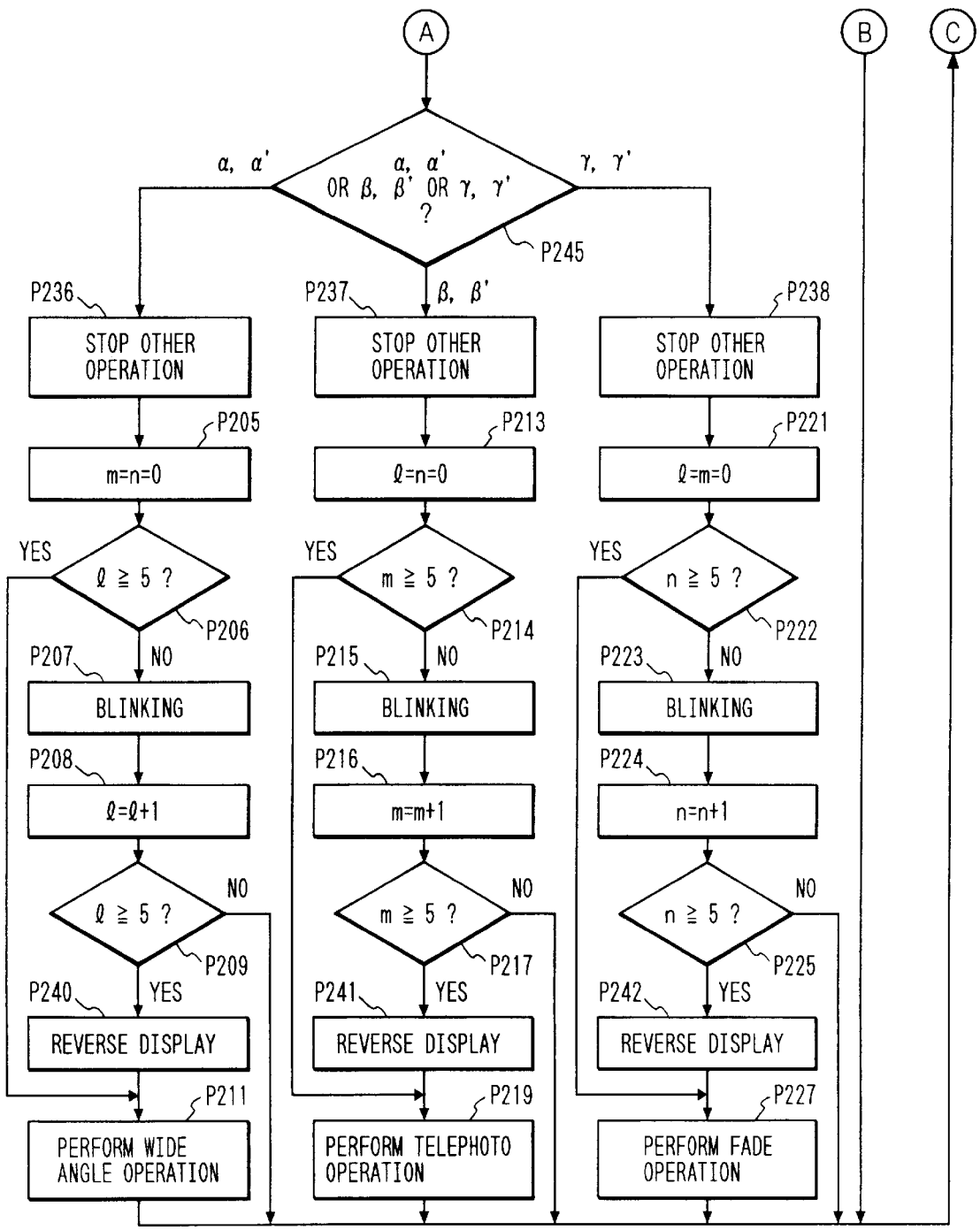
FIG. 6 is comprised of FIGS. 6A and 6B showing flow charts of an operation of system control means of the video camera of the embodiment.

Referring to a flow chart of FIG. 6, an operation of the system control circuit 308 is explained specifically.

In a step P201, the video camera is powered on, and in a step P202, variables l, m and n are reset to 0.

In a step P229, the contents of the groups of coordinates α, β and γ, stored in the respective memory areas of the first memory 309, are stored in respective memory areas 311a, 311b and 311c of the temporary memory 311. In this manner, the function of the viewpoint switch is ready.

The variables l, m and n represent the counts of the numbers of times of coincidence of the coordinates of the viewpoint of the operator with the following one of the coordinates of the group of coordinates α or α' stored in the first memory area 311a in the temporary memory 311, one of the coordinates of the group of coordinates β or β' stored in the first memory area 311b in the temporary memory 311, and one of the coordinates of the group of coordinates γ or γ' stored in the first memory area 311c in the temporary memory 311.

The system control circuit 308 continuously receives the coordinate of the viewpoint of the operator on the finder screen 302 while the operator watches the finder screen 302 and the viewpoint detection is normally performed. In a step P230, the system control means 308 determines whether one of the variables l, m and n is no smaller than 1 or not.

If all of the variables are smaller than 1, the process proceeds to a step P232 to store the contents of the groups of coordinates α, β and γ stored in the memory areas 309a, 309b and 309c of the first memory 309 to the memory areas 311a, 311b and 311c of the temporary memory 311, respectively.

On the other hand, if one of the variables l, m and n is no smaller than 1, the corresponding variable is identified in a step P231. When the variable l is no smaller than 1, the content of the group of coordinates α' stored in the first memory area 310a in the second memory 310 is stored in the first memory area 311a in the temporary memory 311 in a step P233.

When the variable m is no smaller than 1, the content of the group of coordinates β' stored in the second memory area 310b in the second memory 310 is stored in the memory area 311b in the temporary memory 311 in a step P234. When the variable n is no smaller than 1, the content of the group of coordinates γ' stored in the third memory area 311c in the second memory 310 is stored in the third memory area 311c in the temporary memory 311 in step P235.

In this manner, when the content of the group of coordinates is stored in the memory area 311a, 311b or 311c in the temporary memory 311 from the first memory 309 or the second memory 310 by one of the steps P231, P233, P234 and P235, the process proceeds to a step P203.

In the following description, it is assumed that the operator watches the index W of the wide angle function. Namely, the viewpoint of the operator on the finder screen 302 is detected in the step P203.

When it is determined that the coordinate of the detected viewpoint essentially coincide with one of the groups of coordinates α and α' stored in the first memory area 311a of the temporary memory 311 by the steps P244 and P245, the system control means 308 stops the operation of the function other than the wide angle function in a step P236, and resets the variables m and n to 0 in a step P205.

Then, whether the count represented by the variable l is greater than a predetermined number of times (5 times in the present embodiment) or not is determined in a step P206. If it is smaller than 5 times, the display of the index W is blinked in a step P207. By blinking it, the watching of the index W is informed to the operator.

The variable l is incremented by one in a step P208, and whether the variable l is no smaller than 5 or not is again determined in a step P209. If it is smaller than 5, the process returns to the step P230.

On the other hand, when it is determined that the variable l is no smaller than 5 in a step P209, the index W is intensity inverted in a step P240 and the zoom lens of the lens system 301 is driven toward the telescopic to perform the zooming function in a step P211. By the intensity inversion of the index W, the operator is informed of the carrying out of the zooming function. The process then returns to the step P230 to repeat the above steps.

If the variable l is no smaller than 5 in the decision of the step P206, the process jumps to the step P211 since the steps P207 to P209 and P240 have already been conducted.

Even when the coordinate of the viewpoint of the operator coincides with one of the groups of coordinates stored in the first memory area 311a of the temporary memory 311, the variable l is reset to 0 in one of the steps P213, P221 or P228 if the viewpoint is moved off the range of the group of coordinates stored in the first memory area 311a even once before the number of times of coincidence reaches 5.

Namely, when the viewpoint of the operator on the finder screen 302 shown in FIG. 4 enters the area 201a including the index W while the operator does not watch the index W, the system control circuit 308 determines that the operator has watched the index W. Then, it expands the area including the index W functioning as the viewpoint switch from the area 201a encircled by the broken line 203a to the area 202a encircled by the broken line 204a.

When the viewpoint of the operator on the finder screen 302 shown in FIG. 4 is moved off the wide area 202a encircled by the broken line 204a including the index W, the system controller circuit 308 determines that the operator does not watch the index W. Then, it returns the area including the index W functioning as the viewpoint switch from the area 202a encircled by the broken line 204a to the area 201a encircled by the broken line 203a.

When the operator watches the index T or F, the operation is similar. For example, when it is determined that the coordinate of the viewpoint of the operator detected in the step P203 essentially coincides with the coordinates of one of the groups of coordinates $\beta$ and $\beta'$ stored in the second memory area 311b in the temporary memory 311, the system control circuit 308 stops the operation of the function other than the telescopic function in a step P237 and resets the variables l and n to 0 in a step P213.

If it is determined in a step P214 that the variable m is smaller than 5, the index T is blinked in a step P215. The variable m is incremented by one in as step P216 and whether the variable m is no smaller than 5 or not is determined in a step P217. If it is no smaller than 5, the index T is intensity inverted in a step P241 and the telescopic function is performed in as step P219.

When it is determined that the coordinate of the operator's viewpoint detected in the step P203 essentially coincides with the coordinate of one of the groups of coordinates $\gamma$ and $\gamma'$ stored in the third memory area 311c in the temporary memory 311 in a step P245, the system controller circuit 308 stops the operation of the functions other than the fading function in a step P238 and resets the variables l and m to 0 in the step P213.

When it is determined in a step P222 that the variable n is smaller than 5, the display of the index F is blinked in a step P223. The variable n is incremented by one in a step P224, and whether the variable n is no smaller than 5 or not is determined in a step P225. If n is no smaller than 5, the index F is intensity inverted in a step P242 and the fading function is performed in a step P227.

If it is determined that the coordinate of the operator's viewpoint detected in the step P203 does not coincide with any one of the groups of coordinates stored in the respective memory areas 311a, 311b or 311c of the temporary memory 311 in a step P244, the system control circuit 308 renders the finder screen 302 to a normal display state in a step P243. The operation of the wide angle function, the telescopic function and the fading function are all stopped in a step P239 and the variables l, m and n all are reset to 0 in the step P228.

In accordance with the present invention, when the operator intends to activate the viewpoint switch by watching one of the indices, the operator exactly must watch the index the only first time and thereafter the area of the index functioning as the viewpoint switch is set widely on the finder screen. Thus, the viewpoint of the operator must not coincide exactly with the index. Accordingly, the operator need not pay attention and the fatigue caused by activating the function by the viewpoint is remarkably reduced.

Since the area of the index functioning as the viewpoint switch is not set wide from the beginning, the risk of activating the function of the viewpoint switch against the operator's intent is reduced.

In the present embodiment, during the period from the watching of the index W by the operator to the execution of the wide angle function, the index W is blinked so long as the operator watches the vicinity of the index, and during the execution of the wide angle function, the index W is displayed with the intensity inversion. Thus, the operator can identify the operation status of the viewpoint switch by one glance.

The area 201a in the boundary shown by the broken line 203a including the index W on the finder screen 302 shown in FIG. 4 may be set more narrowly than the area of the group of coordinates $\alpha$. By doing so, the risk of activating the viewpoint switch against the intent of the operator can be reduced.

As a second embodiment, the indices of the viewpoint switch such as W, T and F to be displayed on the finder screen 302 in the previous embodiment may be set to colors different from the index which is not the function of the viewpoint switch (for example, date). By doing so, the operator may discriminate the indices which function as the viewpoint switch from other indices of information displayed in the finder, so that malfunction by inadvertently watching the index of the viewpoint switch is reduced. Such a display control is performed by the system control circuit 308.

In the first and second embodiment, the content of the group of coordinates stored in the second memory 210 is stored in the temporary memory 311 when the variables l, m and n are no smaller than 1 as shown in the steps P233, P234 and P235, although this value may be 2 or any number. The timing to activate the operation of the viewpoint switch is 5 times in the above embodiment, although it may be any number of times.

Thus, even when the operator watches an unintended index, the index is not immediately blink displayed and inadvertent blinking of various indices as the viewpoint of the operator moves is avoided.

In the above embodiments, the index is blinked or intensity inverted to permit operator to identify the operation status of the viewpoint switch by one glance. Alternatively, the color of the index may be changed.

In accordance with the above embodiments of the video camera having the viewpoint switch, the boundary of the area functioning as the viewpoint switch is moved to a different position if viewing of the index on the finder screen by the operator changes, so that only the area which includes the indices of the viewpoint switch to be functioned is automatically set wide. Accordingly, the malfunction of the viewpoint switch, which occurs with the viewpoint switch is operated against the intent of the operator, is reduced, and the viewpoint switch is effectively functioned even if the viewpoint of the operator deviates from the target to some extent. Thus, the fatigue of the operator is reduced.

In accordance with the features of the above embodiments of the video camera having the viewpoint switch, the indices which function as the viewpoint switch and other indices, of the plurality of indices displayed on the finder screen, are displayed with different colors from each other so that the indices which function as the viewpoint switch and other indices can be readily discriminated. Thus, the inadvertent watching of the index of the viewpoint switch is reduced.

In accordance with the above embodiment of the viewpoint control unit, the boundary of the predetermined area on the screen is changed by the on state and the off state of the viewpoint switch means for performing the predetermined function when the watching of the predetermined area for the predetermined time period is detected. Thus, when the viewpoint switch means is in the off state, the predetermined area in the screen is set to a relatively narrow area so that the inadvertent turn-on of the viewpoint switch means by the movement of the operator's viewpoint is reduced. When the viewpoint switch means is turned on intentionally by the operator, the predetermined area is widened beyond that in the off state so that the on state of the viewpoint switch is maintained even if the operator's viewpoint moves to some extent. Thus, the fatigue of the operator caused by the operation of the viewpoint switch is reduced.

In accordance with the features of the above embodiment of the viewpoint control unit, when it is detected that the operator watches the predetermined area continuously the predetermined number of times, the viewpoint switch means is turned on. Thus, even if the operator watches the predetermined area for only a short period below the predetermined number of times, the viewpoint switch means is not turned on and the inadvertent turn-on of the viewpoint switch against the intent of the operator is reduced.

In accordance with other feature of the above embodiment of the viewpoint control unit, the display of the predetermined area is changed between the on state and the off state of the viewpoint switch means. Thus, whether the viewpoint switch is in the on state or the off state can be clearly discriminated by the difference of the display state of the predetermined area in the screen so that the malfunction of the viewpoint switch means is further reduced.

In accordance with other features of the above embodiment of the viewpoint control unit, the function of the viewpoint switch means is performed when it is detected that the predetermined area in the screen is watched for the first period, and the execution of the function is stopped when it is detected that the predetermined area is watched for the second period. Thus, even if the operator watches the predetermined area for a short period below the first period, the viewpoint switch means is not turned on, and even if the operator deviates the viewpoint off the predetermined area for a short period below the second, the viewpoint switch means is not turned off. Thus, the turn-on or turn-off of the viewpoint switch means against the intent of the operator is reduced. Accordingly, it is not necessary to pay attention not to watch the predetermined area in order to prevent the viewpoint switch means from being turned on or to keep watching the predetermined area in order to prevent the viewpoint switch means from being turned off. Thus, the fatigue of the operator caused by the operation of the viewpoint switch means is reduced and the malfunction of the viewpoint switch means is reduced.

In accordance with other features of the above embodiments of the viewpoint control unit, the first period is set longer than the second period. Thus, the turn-on of the viewpoint control switch against the intent of the operator is further reduced.

A third embodiment of the present invention is explained in the following description.

The assignee of the present application has proposed a function to display indices representing functions such as zooming and fading on the finder screen of the video camera and selecting one of them by the viewpoint (Japanese Laid-Open Patent Application No. 4-202).

However, some error frequently is included between the detected coordinate and the coordinate which is operator actually watches. Accordingly, even if the operator intends to watch an index, the index detected by the viewpoint detection means does not necessarily correspond to the index which the operator watches.

As a result, even if the operator intends to watch a particular index of the viewpoint switch, the detected index does not correspond to the intended index and the intended function may not be performed. On the other hand, even if the operator does not intend to watch an index, the function corresponding to the index may uncontrollably operate.

In the light of the above, the following embodiment is intended to secure easy function selection operation by watching the index.

In accordance with an embodiment to be described below, there is provided a video camera comprising: viewpoint switch means for activating a function represented by one of a plurality of indices representing different operational functions displayed on a finder screen when a viewpoint of an operator resides in said one index; and index display state control means for changing the display state of the index to a different display state when the viewpoint of the operator resides.

The index display state control means includes a viewpoint detection device which changes the display state of the index to a different state when the viewpoint of the operator resides in the index of the viewpoint switch a predetermined number of times or for a predetermined time period.

The index display state control means blinks the index when the viewpoint of the operator resides in the index of the viewpoint switch the predetermined number of times or for the predetermined time period.

The index display state control means changes the color of the index when the viewpoint of the operator resides in the index of the viewpoint switch the predetermined number of times or for the predetermined time period.

The index display state control means changes the display state of the index when the viewpoint of the operator resides in the index of the viewpoint switch to activate the corresponding function.

By providing those means, when the viewpoint of the operator resides in one of the indices of the viewpoint input displayed on the finder screen, the display state of the index changes so that the operator may select the function while he/she confirms the viewpoint state of his/her own viewpoint.

The third embodiment of the video camera having the viewpoint detection unit is now explained in conjunction with the drawings.

Figure 10:
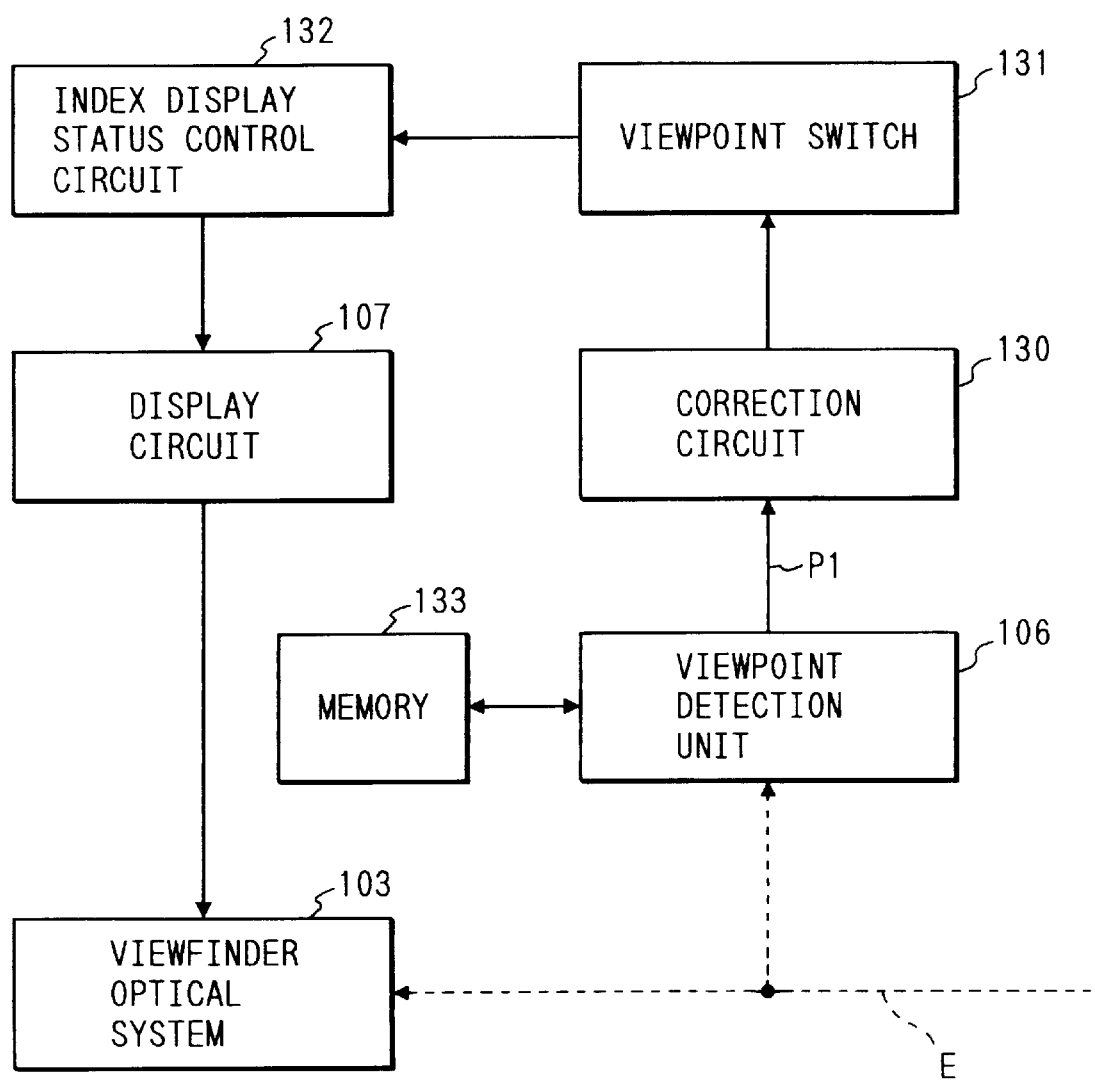
FIG. 10 shows a block diagram of a general configuration of a video camera in a third embodiment of the present invention.

FIG. 10 shows a block diagram of a schematic configuration of the video camera having the viewpoint detection unit.

As shown in FIG. 10, the video camera having the viewpoint detection unit of the present embodiment comprises a finder optical system 103, viewpoint detection means 106, a display circuit 107, a correction circuit 130, a viewpoint switch 131, an index display state control circuit 132 and a memory 133.

The finder optical system 103 is provided to permit the observation of an object to be photographed by the video camera. The viewpoint detection means 106 detects a viewpoint position of an observer who observes the finder optical system 103.

The correction means 130 is provided to output information on the direction of the viewpoint of the eye of the observer by correcting a detection output P1 derived from the viewpoint detection means 106 by errors along a view axis and the viewpoint. The index display state control means 132 is provided to change the display state of the index to be displayed on the finder screen.

In the video camera of the present embodiment thus constructed, the index display state control means 132 controls the display state of the index on the finder screen in accordance with the detection output P1. Specifically, when the viewpoint of the operator is detected, the display state of the index is changed to a different display state.

Detail of the video camera having the viewpoint detection unit of the present embodiment is now explained in conjunction with the drawings.

Figure 11:
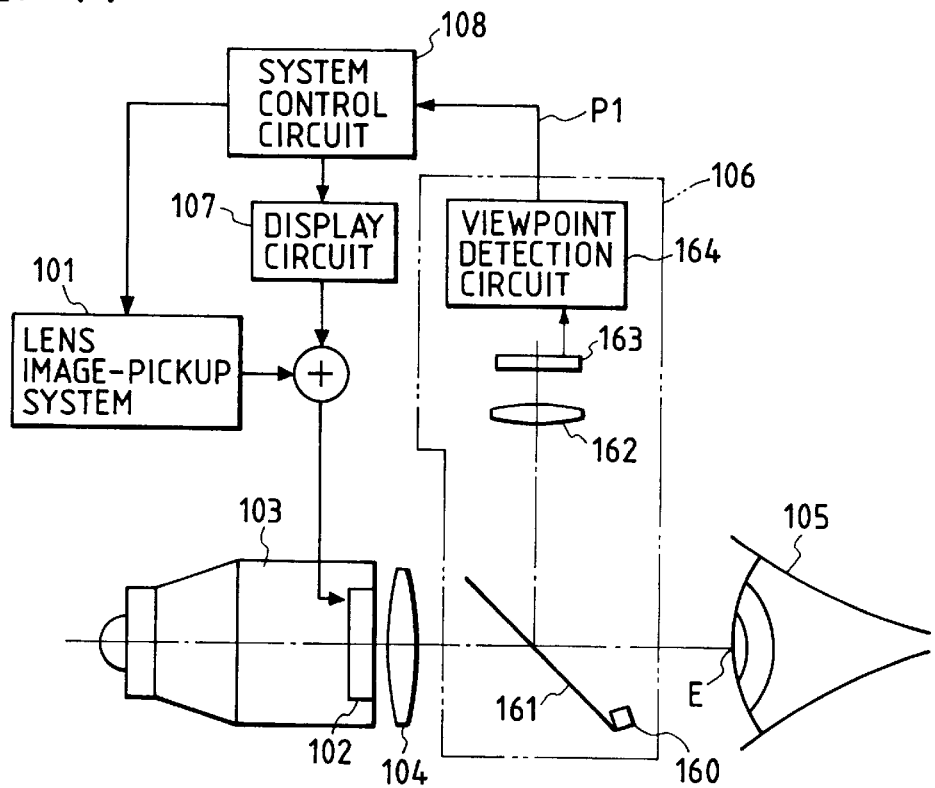
FIG. 11 shows a block diagram of a configuration of the video camera in the third embodiment.

As shown in FIG. 11, the video camera of the present embodiment comprises a lens system 101, a finder screen 102, a finder optical system 103, an eye lens 104, viewpoint detection means 106, a display circuit 107 and a system control circuit 108.

The lens system 101 is provided to photograph an object and has a zoom lens. The finder optical system 103 is provided to permit the observation of the object photographed by the lens system 101 and has the finder screen 102.

The eye lens 104 is arranged in front of the finder optical system 103 and the operator watches the finder screen 102 through the eye lens 104. The viewpoint detection means 106 detects the viewpoint E of the eye 105 of the operator.

The display circuit 107 is provided to display an AF frame representing a focus area, indices of the viewpoint switch to be described later, and other information necessary to the operator such as a tape count and a photographing mode on the finder screen 102. The system control means 108 is provided to control the respective units of the camera.

The viewpoint detection means 106 comprises an infrared ray emitting diode 160 for irradiating an infrared ray to the eye 105 of the operator, a dichroic mirror 161 for passing a visible ray and reflecting the infrared ray, a focusing lens 162 for focusing the infrared ray reflected by the dichroic mirror 161, a photo-electric converter for converting the infrared ray focused by the focusing lens 162 to an electrical signal, and a viewpoint detection circuit 164 for determining the viewpoint of the operator on the finder screen based on the image of the eye 105 of the operator on the photo-electric converter 163.

In this manner, since the visible ray passes through the dichroic mirror 161, the operator may observe the finder screen 102 through the dichroic mirror 161.

Since the dichroic mirror 161 reflects the infrared ray, it reflects the reflected image of the eye 105 illuminated by the infrared ray emitting diode 160. The reflected image is focused by the focusing lens 162 and focused on the photo-electric converter 163.

The viewpoint detection circuit 164 determines the viewpoint of the operator on the finder screen 102 based on the image of the eye 105 of the operator on the photo-electric converter 163, in accordance with the algorithm disclosed in Japanese Laid-Open Patent Application Nos. 1-241511 and 2-32312.

The function of the viewpoint switch mounted on the finder optical system 103 of the video camera of the present embodiment is explained in the following description.

Figure 12:
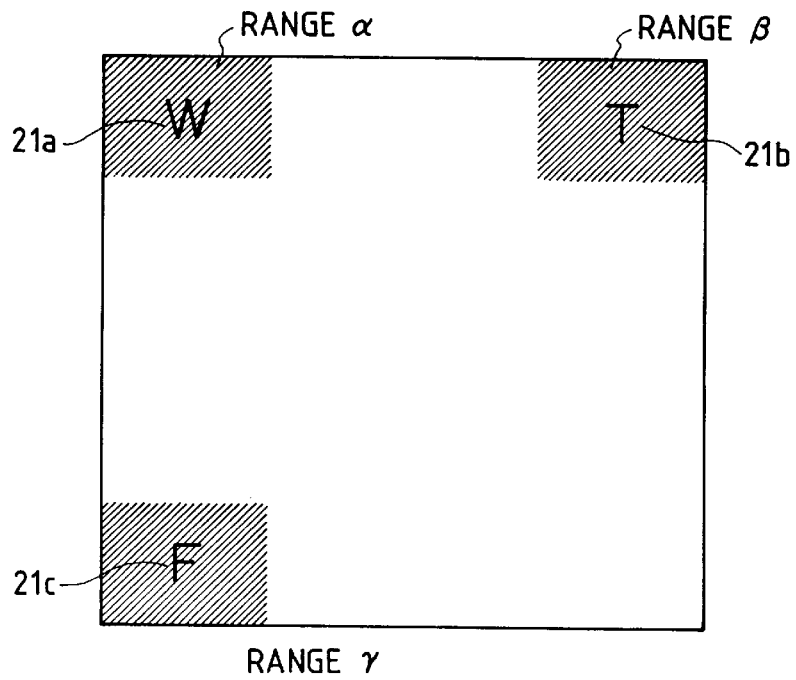
FIG. 12 shows an example of display of a finder screen.

FIG. 12 shows an example of display of the finder screen 102. As shown, a menu comprising indices 21a, 21b and 21c representing different operational functions represented by alphabetic characters W, T and F is displayed.

Figure 13:
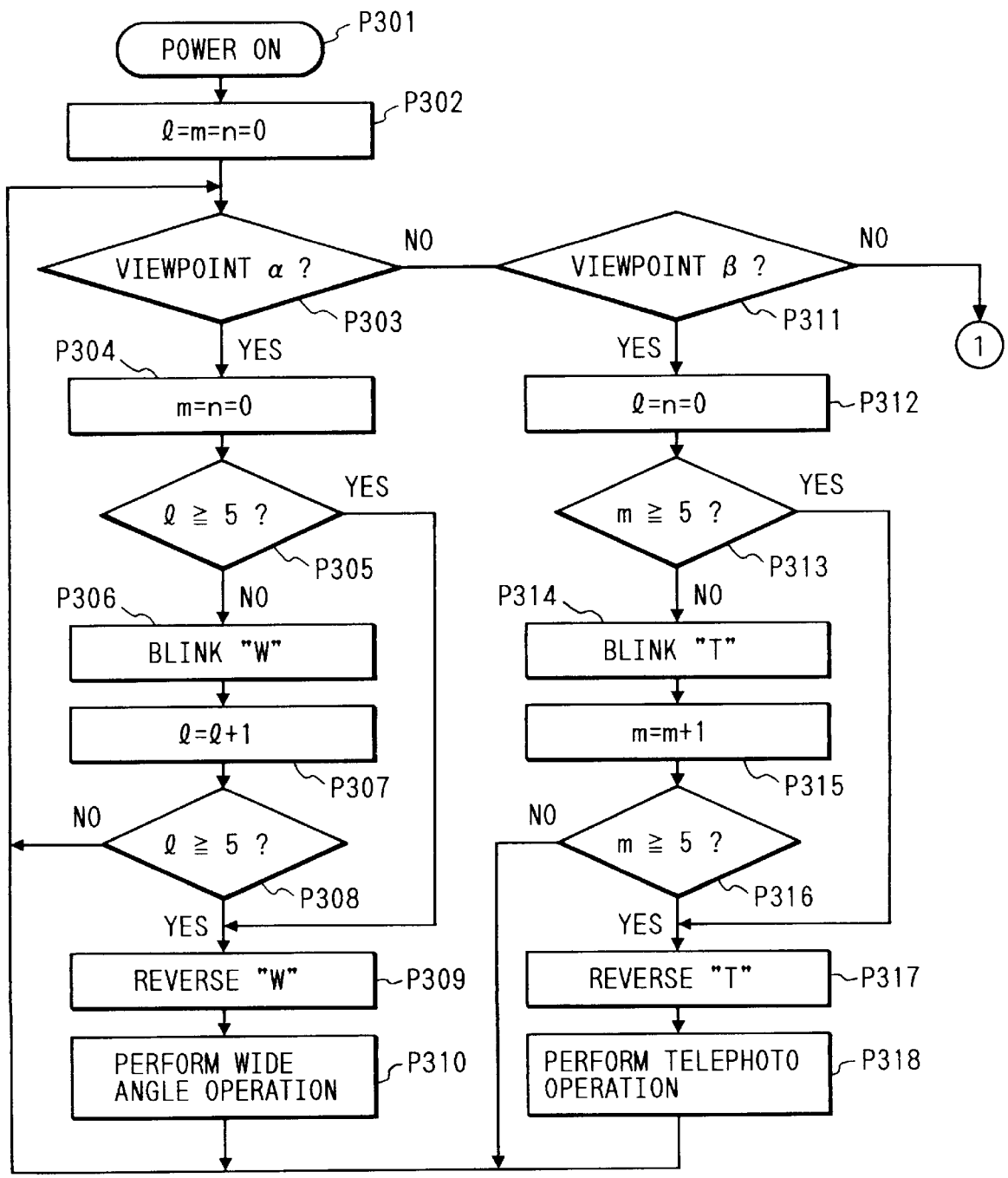
FIG. 13 shows a flow chart of a procedure of a system control circuit.
Figure 14:
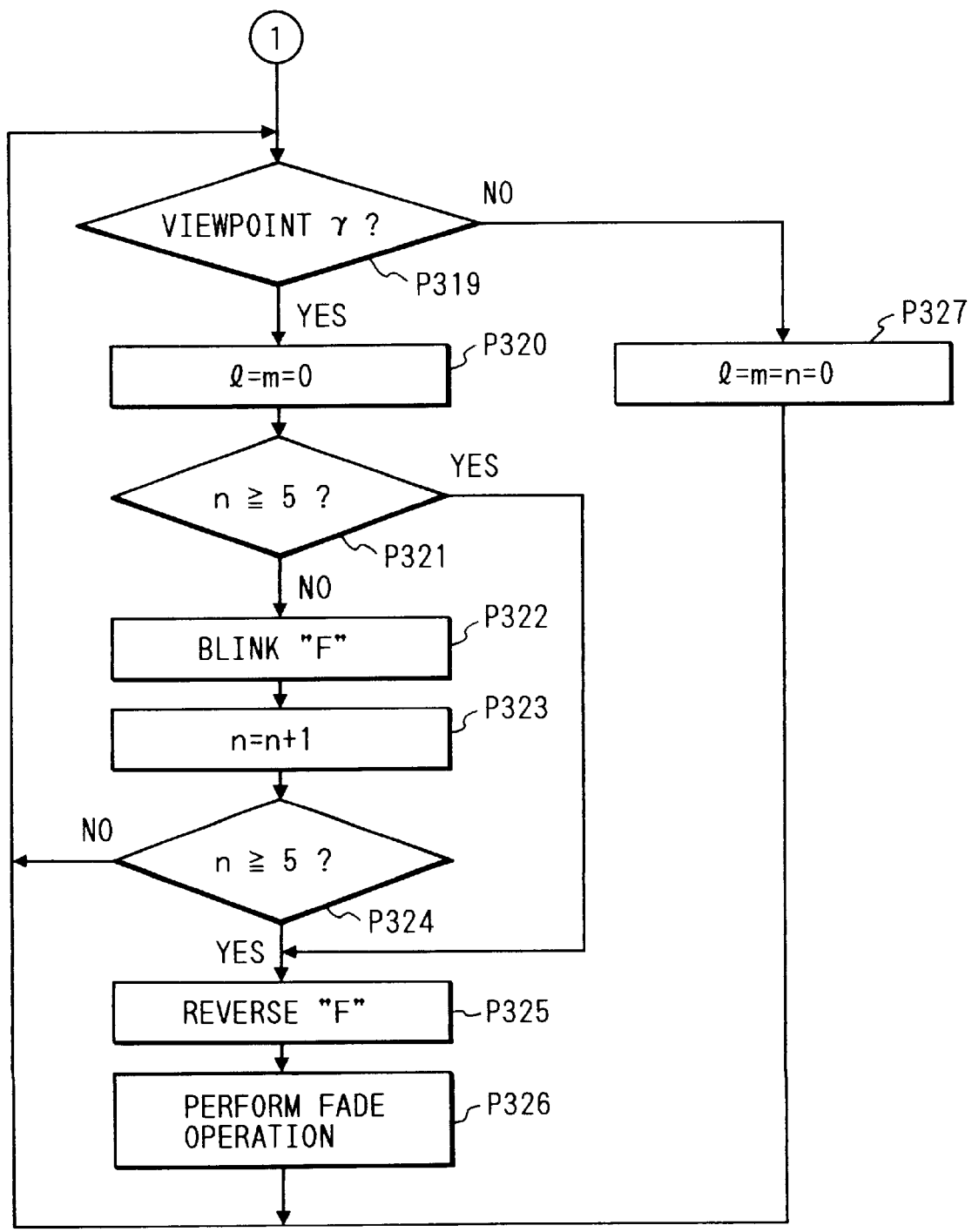
FIG. 14 shows a flow chart of procedure of a system control circuit.

Referring to flow charts of FIGS. 13 and 14, a specific operation of the system control means 108 is explained.

Coordinates of a predetermined area including the indices of the viewpoint switch are stored in a read-only memory (for example, coordinate $\alpha$ for a wide angle function, coordinate $\beta$ for a telescopic function and coordinate $\gamma$ for a fading function).

In a step P301, the video camera is powered on and variables l, m and n are reset to 0 (step P302) so that the viewpoint switch is ready. The variables l, m and n represent the number of times of coincidence of the viewpoint of the operator with the coordinates $\alpha$, $\beta$ and $\gamma$, respectively.

The system control means continuously receives the viewpoint coordinate of the operator on the finder screen 102 from the viewpoint detection means while the operator watches the finder screen 102 and the viewpoint detection is normally conducted in steps P303, P311 and P319.

It is assumed that the operator watches the index W of the wide angle function. If the coordinate of the viewpoint essentially coincides with the coordinate a by the decision in the step P303, the system control means 108 resets the variable m and n to 0 (step P304).

Then, whether the variable l is larger than a predetermined number of times (5 times in the present embodiment) or not is determined (step P305). If it is smaller, the display of the index W is blinked (step P306). The variable l is incremented by one (step P307) and whether the variable l is larger than 5 or not is determined (step P308).

If the variable l is smaller than 5 by the decision in the step P308, the process returns to the step P303 to receive the viewpoint coordinate from the viewpoint detection circuit. If the variable l is no smaller than 5 by the decision of the step P308, the index W is displayed with intensity inversion and the zoom lens is driven toward the wide angle. Then, the process returns to the step P303 to receive the viewpoint coordinate.

On the other hand, if the variable l is no smaller than 5 in the decision of the step P305, the process directly jumps to step P309.

If the viewpoint moves off the area $\alpha$ in the decision of the step P303, the process moves to a step P311. Namely, even if the coordinate $\alpha$ coincides with the viewpoint coordinate, the variable l is reset to 1 if the viewpoint is even once moved off the coordinate a before the number of times of coincidence reaches 5 times (steps P312, P320 and P327). When the operator watches other index, that is, T representing the telescopic function or F representing the fading function, the operation procedure is similar.

In the present embodiment, the index is blinked or intensity inverted, although it may be displayed in a different color. The index may be a picture or illustration, and the shape of the index may be changed instead of the intensity inversion.

The manner of display of the index may be changed when the function has actually been executed. By doing so, the operator can select a desired function and confirm the operation of the selected function by merely watching the finder screen 102.

In accordance with the present embodiment, when the viewpoint of the operator resides in one of the indices of the viewpoint input displayed on the finder screen, the display state of the index is changed so that the operator may select the function while he/she confirms the viewpoint state. Thus, the operator can readily be informed of the exact coincidence of his/her viewpoint coordinate of with the coordinate of the viewpoint switch and the normal operation of the function of the viewpoint switch, and the problem of inadvertent coincidence of the viewpoint coordinate and the coordinate of the viewpoint switch is avoided.

What is claimed is:

1. An electronic equipment comprising:
   display means for displaying an index representing a predetermined function on a screen;
   viewpoint detection means for detecting a viewpoint position of an operator on the screen;
   function control means for performing the function represented by the index when said viewpoint detection means detects that the viewpoint of the operator watches a predetermined area, in which the index is displayed, for a predetermined time period; and
   control means for changing a border position of said predetermined area on the screen in accordance with the change of state of watching by the operator of the predetermined area in which the index is displayed.

2. An electronic equipment according to claim 1, wherein said display means displays a plurality of indices representing a plurality of functions including said function.

3. An electronic equipment according to claim 1, wherein said viewpoint detection means samples the viewpoint position at a predetermined period.

4. An electronic equipment according to claim 1, wherein said control means changes the position of the border line of the predetermined area between before and after activating the function by monitoring the watching by the operator of the predetermined area in which the index is displayed.

5. An electronic equipment according to claim 4, wherein said control means expands the predetermined area by activating the function by monitoring the watching by the operation of the predetermined area in which the index is displayed.

6. An electronic equipment according to claim 4, wherein said control means changes only the border line of the predetermined area without changing the size of the display of the index.

7. An electronic equipment according to claim 1, wherein said display means displays the indices for controlling the function including said index in a different color than that of the display in the screen.

8. An electronic equipment comprising:
   display means for displaying an index representing a predetermined function on a screen;
   viewpoint detection means for detecting a viewpoint position of an operator on the screen;
   function control means for shifting the function represented by the index to an activation state or an inactivation state when said viewpoint detection means detects that the operator watches the index for a predetermined time period; and
   control means for changing a display of the index on the basis of a detection of the viewpoint detection means between (i) a state in which the viewpoint is not on the index, (ii) a state in which the viewpoint remains on the index during the predetermined time period, and (iii) a state in which the function is carried out in response to the detection of the viewpoint having remained on the index for the predetermined time period.

9. An electronic equipment according to claim 8, wherein said display means displays a plurality of indices representing a plurality of functions including said function.

10. An electronic equipment according to claim 8, wherein said viewpoint detection means samples the viewpoint position at a predetermined period.

11. An electronic equipment according to claim 10, wherein said control means (i) shifts the function to the activation state when the watching by the operator of a predetermined area in which the index is displayed is detected continuously a predetermined number of times of sampling, and (ii) changes the predetermined number of times of sampling between when the function is shifted from the deactivation state to the activation state and when the function is shifted from the activation state to the non-activation state.

12. An electronic equipment according to claim 11, wherein said control means changes the size of the display of the index and the viewpoint detection area.

13. An electronic equipment according to claim 8, wherein said display means changes a display of the indices for controlling the function including said index in a different color than that of another display in the screen.

14. A video camera having a viewpoint switch comprising:
   viewpoint switch means for activating a function represented by one of a plurality of indices representing different functions displayed on a monitor screen when said one index is watched by an operator for a predetermined time period; and
   area modification means for moving a border line of an area functioning as said viewpoint switch means on the finder screen to a different position as a state of watching the index by the operator changes.

15. A video camera according to claim 14, wherein the index has a different display area than a viewpoint detection area, and the border line of only the viewpoint detection area is changed.

16. A video camera according to claim 14, wherein said area modification means changes the border line position between when the function is activated and when the function is deactivated.

17. A video camera according to claim 16, wherein said area control means expands the border line when the function is activated.

18. A video camera according to claim 14, further comprising:
   display state control means for displaying the indices functioning as the viewpoint switch and the indices not functioning as the viewpoint switch, among a plurality of indices displayed on the monitor screen, in different colors from each other.

19. A video camera comprising:
  viewpoint switch means for activating a function represented by an index displayed on a monitor screen when the index is watched by an operator for a predetermined time period;
  viewpoint detection means for detecting a viewpoint position of the operator on the finder screen;
  discrimination means for determining whether the viewpoint detected by said viewpoint detection means is present in an area functioning as the viewpoint switch for the predetermined time period or not; and
  area modification means for moving a border line of the area functioning as the viewpoint switch to a position in accordance with the determination by said discrimination means.

20. A video camera according to claim 19, wherein a plurality of indices representing a plurality of functions are displayed.

21. A video camera according to claim 19, wherein the index has a different display area than a viewpoint detection area, and the border line of only the viewpoint detection area is changed.

22. A video camera according to claim 21, wherein said area modification means changes the border line position between when the function is activated and when the function is deactivated.

23. A video camera according to claim 22, wherein said area control means expands the border line when the function is activated.

24. A video camera according to claim 19, further comprising:
  display state control means for displaying the indices functioning as the viewpoint switch and the indices not functioning as the viewpoint switch, among a plurality of indices displayed on the monitor screen, in different colors from each other.

25. A video camera according to claim 19, wherein said monitor screen comprises an EVF and said viewpoint detection means is arranged in the EVF.

26. A viewpoint control unit comprising:
  viewpoint detection means for detecting a viewpoint on a screen;
  viewpoint switch means for activating a function when said viewpoint detection means detects an observer watching a predetermined area on the screen for a predetermined time period; and
  control means for changing a border line of the predetermined area between the activation state and the deactivation state of said viewpoint switch means.

27. A viewpoint control unit according to claim 26, wherein said detection means turns on said viewpoint switch means when the viewpoint is sampled at a predetermined period and the predetermined area is watched continuously a predetermined number of times.

28. A viewpoint control unit according to claim 26, wherein said viewpoint switch means changes the display of the predetermined area between the on state and the off state.

29. A viewpoint control unit according to claim 28, wherein the function of said viewpoint switch means comprises a zooming function.

30. A viewpoint control unit according to claim 28, wherein the function of said viewpoint switch means comprises a fading function.

31. A viewpoint control unit comprising:
  viewpoint detection means for detecting a viewpoint on a screen; and
  viewpoint switch means for performing a predetermined function when said viewpoint detection means detects an observer watching a predetermined area on the screen for a first time period, and for stopping the execution of the function when said viewpoint detection means detects the observer watching the predetermined area for a second time period different from the first time period.

32. A viewpoint control unit according to claim 31, wherein said viewpoint detection means turns on said viewpoint switch means when the viewpoint is sampled at a predetermined period and the predetermined area is watched continuously a predetermined number of times.

33. A viewpoint control unit according to claim 31, wherein the first time period is set longer than the second time period.

34. A video camera comprising:
  viewpoint detection means for detecting a viewpoint on a screen;
  viewpoint switch means for activating a function represented by one of a plurality of indices representing different operational functions displayed on a monitor screen when a viewpoint of an operator detected by said viewpoint detection means remains on one index for a first time; and
  index display state control means for changing the display state of the index to a first display state from an initial state in the case that the viewpoint of the operator remains on said one index for a second time shorter than the first time, and for changing the display state of said one index to a second display state from the first display state in the case that the viewpoint of the operator remains on said one index for the first time.

35. A video camera according to claim 34, wherein said index display state control means changes the display state of the index to a different state in the case that the viewpoint of the operator remains on the index of the viewpoint switch a predetermined number of times or for a predetermined time period.

36. A video camera according to claim 34, wherein said index display state control means blinks the index in the case that the viewpoint of the operator remains on the index of the viewpoint switch the predetermined number of time or for the predetermined time period.

37. A video camera according to claim 34, wherein said index display state control means changes the color of the index in the case that the viewpoint of the operator remains on the index of the viewpoint switch the predetermined number of times or for the predetermined time period.

38. A video camera according to claim 34, wherein said index display state control means changes the display state of the index in the case that the viewpoint of the operator remains on the index of the viewpoint switch to activate the corresponding function.

* * * * *

UNITED STATES PATENT AND TRADEMARK OFFICE
CERTIFICATE OF CORRECTION

PATENT NO. : 5,990,954

DATED : November 23, 1999

INVENTOR(S) : Takashi Kobayashi et al.      Page 1 of 4

It is certified that error appears in the above-identified patent and that said Letters Patent is hereby corrected as shown below:

ON THE COVER PAGE, Item
[56] References Cited

"4,595,980 6/1986 Garwin et al." should read --4,595,990 6/1986 Garwin et al.--;

"05183798" should read --5-183798--;

"3087818 12/1991 Japan" should read --3087818 12/1991 European Patent Office--; and "4023027 1/1992 Japan" should read --4023027 1/1992 European Patent Office--.

UNITED STATES PATENT AND TRADEMARK OFFICE
CERTIFICATE OF CORRECTION

PATENT NO. : 5,990,954

DATED : November 23, 1999

INVENTOR(S) : Takashi Kobayashi et al.

Page 2 of 4

It is certified that error appears in the above-identified patent and that said Letters Patent is hereby corrected as shown below:

<u>COLUMN 1</u>
   Line 14, "image in com-" should be deleted; and
   Line 15, "mon" should be deleted; and "in common" should be deleted.

<u>COLUMN 5</u>
   Line 30, "$\delta y$" should read --$\theta y$--; and
   Line 31, "(1)" should read --(1),--.

<u>COLUMN 6</u>
   Line 36, "a" should be deleted.

<u>COLUMN 7</u>
   Line 2, "coordinates a" should read --coordinates $\alpha$--.

UNITED STATES PATENT AND TRADEMARK OFFICE
CERTIFICATE OF CORRECTION

PATENT NO. : 5,990,954

DATED : November 23, 1999

INVENTOR(S): Takashi Kobayashi et al.   Page 3 of 4

It is certified that error appears in the above-identified patent and that said Letters Patent is hereby corrected as shown below:

COLUMN 9
  Line 47, "are" should read --is--; and
  Line 55, "area" should read --areas--.

COLUMN 10
  Line 20, "numbers" should read --number--.

COLUMN 12
  Line 24, "the" (4th occurrence) should read --only--; and
  Line 25, "only" should read --the--.

COLUMN 13
  Line 54, "feature" should read --features--; and
  Line 60, "in" should read --of--.

COLUMN 14
  Line 28, "is operator" should read --the operator--.

UNITED STATES PATENT AND TRADEMARK OFFICE
CERTIFICATE OF CORRECTION

PATENT NO. : 5,990,954

DATED : November 23, 1999

INVENTOR(S): Takashi Kobayashi et al.

Page 4 of 4

It is certified that error appears in the above-identified patent and that said Letters Patent is hereby corrected as shown below:

COLUMN 16
   Line 44, "coordinate a" should read --coordinate or--.

COLUMN 17
   Line 1, "coordinate a" should read --coordinate or--.
   Line 20, "can readily be" should read --readily can be--.

Signed and Sealed this

Thirteenth Day of February, 2001

*Attest:*

NICHOLAS P. GODICI

*Attesting Officer*     Acting Director of the United States Patent and Trademark Office